United States Patent [19]

Rutledge

[11] 4,346,433
[45] Aug. 24, 1982

[54] PROCESS CONTROL

[75] Inventor: Robert W. Rutledge, Bartlesville, Okla.

[73] Assignee: Phillips Petroleum Company, Bartlesville, Okla.

[21] Appl. No.: 129,295

[22] Filed: Mar. 11, 1980

[51] Int. Cl.³ ............... G06G 7/66; G05B 11/42; G05B 13/04

[52] U.S. Cl. .................. 364/162; 318/561; 318/610; 318/621; 364/149; 364/152; 364/157; 364/177

[58] Field of Search ........... 364/105, 118, 106, 553, 364/121; 318/561, 610, 611, 621

[56] References Cited

U.S. PATENT DOCUMENTS

| | | | |
|---|---|---|---|
| 3,497,779 | 2/1970 | Eisele | 318/611 |
| 3,552,428 | 1/1971 | Pemberton | 364/105 X |
| 3,571,578 | 3/1971 | Fry | 364/105 |
| 3,614,633 | 10/1971 | Yalyshev et al. | 318/610 X |
| 3,696,282 | 10/1972 | Hirokawa et al. | 318/610 X |
| 3,741,474 | 6/1973 | Kawada et al. | 364/105 |
| 3,826,887 | 7/1974 | Pemberton | 318/561 X |
| 3,925,640 | 12/1975 | Duggan | 364/105 |
| 4,069,413 | 1/1978 | Rutledge et al. | 364/118 |
| 4,195,337 | 3/1980 | Bertrano et al. | 318/610 X |
| 4,214,300 | 7/1980 | Barlow et al. | 364/105 |

Primary Examiner—Joseph F. Ruggiero

[57] ABSTRACT

A process control system is provided in which a process variable is compared to a set point for the process variable by a process controller with the results of the comparison being utilized to control the process in such a manner that the process variable will be substantially equal to the set point for the process variable. A critically damped response of the process variable to a change in the set point is achieved by utilizing a process controller which has the characteristics of a proportional-integral-derivative controller followed by a first order lag. Tuning of the process controller is accomplished by changing a time constant which is common to the proportional, integral and derivative terms of the proportional-integral-derivative controller and also common to the first order lag.

1 Claim, 2 Drawing Figures

PROCESS CONTROL

This invention relates to process control. In one aspect this invention relates to process control wherein the process response to a set point change is generally critically damped. In another aspect this invention relates to a process controller which can be easily tuned.

The drawings which will be utilized to provide background information concerning the present invention and provide both a broad and detailed description of the present invention are briefly described as follows.

Figure 1:
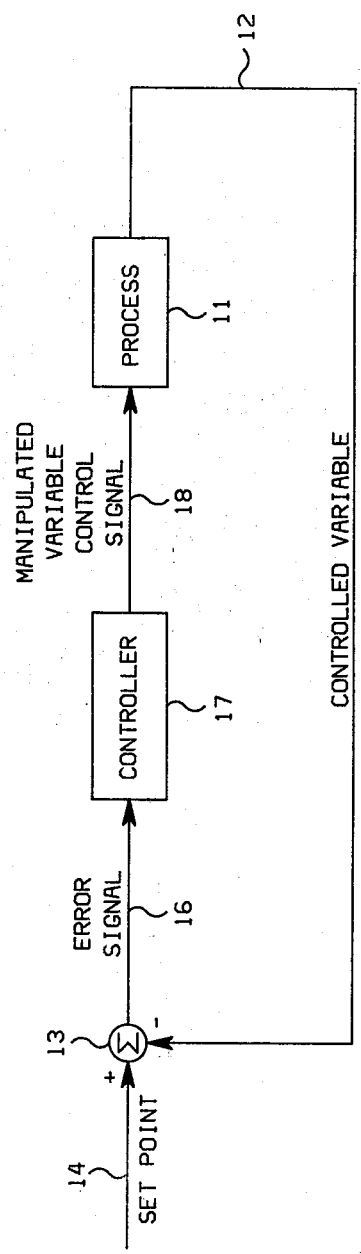
FIG. 1 is a diagrammatic illustration of a general process control system.

Referring now to the FIG. 1, there is illustrated a process 11 which may vary from a simple process such as a heating system for a home to a very complex process such as a chemical manufacturing process. If the process 11 were a home heating system then the controlled process variable (CV) would be the temperature in the home. A signal 12 which is representative of the temperature in the home is provided from the process 11 to the subtrahend input of the summing junction 13. A set point (SP) signal 14 which is representative of the desired temperature in the home is provided to the minuend input of the summing junction 13. The summing junction 13 effectively subtracts the actual temperature in the home from the desired temperature in the home to form an error signal 16 which is representative of the difference between the set point signal 14 and the controlled process variable signal 12. The error signal 16 is operated on by the controller 17 which provides a manipulated variable control signal 18 which is representative of the value of a manipulated variable required to maintain the controlled process variable substantially equal to the set point for the control variable. For a home heating system, signal 18 might be utilized to manipulate the fuel flow rate to a furnace.

Critical damping is a characteristic of a second order system and is defined as the fastest response which results in no overshoot. In terms of FIG. 1, if the set point 14 were changed to a new temperature, the critically damped response of the controlled variable 12 would be that response which changes the controlled variable 12 to the new temperature as quickly as possible without going above the new temperature if the new set point is higher than the old set point or going below the new temperature if the new set point is lower than the old set point. This type of response of a controlled variable to a change in the set point is extremely desirable in a large number of process control applications. In many processes, a controlled variable overshooting its set point following a set point change and then oscillating about the set point until finally settling out is totally undesirable. However, it is also very desirable for the controlled variable to change as quickly as possible to achieve the value of the new set point. Thus, a critically damped process response to a set point change is desirable in many process control applications and it is an object of this invention to provide process control wherein the process response to a set point change is generally critically damped.

In Laplace transform notation, a critically damped controlled variable response to a change in set point is achieved when $$\frac{CV(S)}{SP(S)} = \frac{1}{(\lambda S + 1)(\lambda S + 1)} \quad \text{(I)}$$

where
  $S$ = the Laplace operator; and
  $\lambda$ = one-half of the time required for the process variable to reach 63 percent of the value defined by a new set point.

Where the process 11 is a second order process, the transfer function of the process 11 ($G_P$) can be represented by a general second order equation of the form $$G_P(S) = \frac{K_1}{(\tau_1 S + 1)(\tau_2 S + 1)} \quad \text{(II)}$$

where
  $K_1$ = process gain; and
  $\tau_1$ and $\rho_2$ = process time constants.

CV/SP may also be given in Laplace transform notation by $$\frac{CV(S)}{SP(S)} = \frac{G_P(S)G_C(S)}{1 + G_P(S)G_C(S)} \quad \text{(III)}$$

where $G_C$ is the transfer function of the controller 12. Combining Equations I and III gives $$\frac{G_P(S)G_C(S)}{1 + G_P(S)G_C(S)} = \frac{1}{(\lambda S + 1)(\lambda S + 1)} \quad \text{(IV)}$$

Solving for $G_C(S)$ and substituting the expression for $G_P(S)$ of Equation II into Equation IV gives $$G_C(S) = \left[\frac{\tau_1 + \tau_2}{2K_1\lambda} + \frac{1}{2K_1\lambda S} + \frac{\tau_1\tau_2 S}{2K_1\lambda}\right]\left[\frac{1}{(\lambda/2)(S) + 1}\right]. \quad \text{(V)}$$

Equation V represents a proportional-integral-derivative controller whose output goes to a first order lag having a time constant of $\lambda/2$. Equation V is the transfer function for the controller 12 which will enable the process to be controlled in such a manner that the response of the controlled variable to a set point change will be critically damped.

It is well known that a process controller must be tuned to optimize the operation of the control system. Tuning of a process controller refers to the adjusting of the relationship of the various terms included in the output from the controller. For the process controller having the transfer function of Equation 5, the relationship of the proportional, integral, derivative and lag terms must be adjusted. It is well known that it is generally difficult to adjust a process controller and thus it is another object of this invention to provide a process controller which can be easily tuned.

In accordance with the present invention, a process control system is provided in which the process controller has the transfer function of Equation V. Tuning of the process controller is accomplished by adjusting only the value of $\lambda$. The process controller can be implemented by combining a proportional-integral-derivative controller with a first order lag. The first order lag has a time constant of $\lambda/2$. The proportional-integral-derivative controller has a proportional constant equal to $\tau_1+\tau_2/2K_1\lambda$, an integral constant equal to $\frac{1}{2}K_1\lambda$ and a derivative constant equal to $\tau_1\tau_2/2K_1\lambda$.

The constants $K_1$, $\tau_1$ and $\tau_2$ are determined by the process characteristics. The technique by which these constants are determined is commonly referred to as "identification". Identification refers to the determining of process constants from tests on the process. For the control system illustrated in FIG. 2, the process constants could be determined by changing the flow rate of fuel to the furnace 22 and noting changes in the temperature being controlled.

$\lambda$ is determined from the relationship $$2\lambda = C(\tau_1+\tau_2) \qquad \text{VI}$$

where the constant C is determined by the particular process. In general, C will range from about 0.75 to about 1.25.

The process controller having the transfer function of Equation V can be easily tuned simply by changing the value of the constant C in Equation VI. This effectively changes the value of $\lambda$. Since the term $\lambda$ occurs in all of the constants associated with the transfer function of Equation VI, a process controller having the transfer function of Equation V can be tuned by adjusting only $\lambda$ once the constants $\tau_1$, $\tau_2$ and $K_1$ have been determined for a particular process.

Other objects and advantages of the invention will be apparent from the foregoing brief description of the invention and the claims as well as the following detailed description of the invention.

The desired response of the process variable to a change in the set point is a critically damped response. However, even though the critically damped response is desired, it is generally impossible to achieve a perfectly critically damped response. This is generally caused by inaccuracies in the process model of Equation II. It is generally not possible to mathematically model a physical process with complete accuracy. Thus, even though the present invention is directed to achieving a critically damped response of the process variable to a change in the set point, the invention is not limited to achieving exactly a critically damped response but is rather applicable to achieving the closest approximation of a critically damped response which is feasible for a particular process, when the process is modeled by a second order equation of the general form of Equation II.

The output of the process controller (MV) is determined by the magnitude of the error signal (E) and the transfer function of the process controller as set forth in Equation V. Thus, in Laplace transform notation, the output of the controller may be represented as $$MV(S) = \left[\left(\frac{\tau_1+\tau_2}{2K_1\lambda}\right)(E) + \left(\frac{E}{2K_1\lambda}\right)\left(\frac{1}{S}\right) + \left(\frac{\tau_1\tau_2 E}{2K_1\lambda}\right)(S)\right]\left[\frac{1}{(\lambda/2)(S)+1}\right] \qquad \text{(VII)}$$

Figure 2:
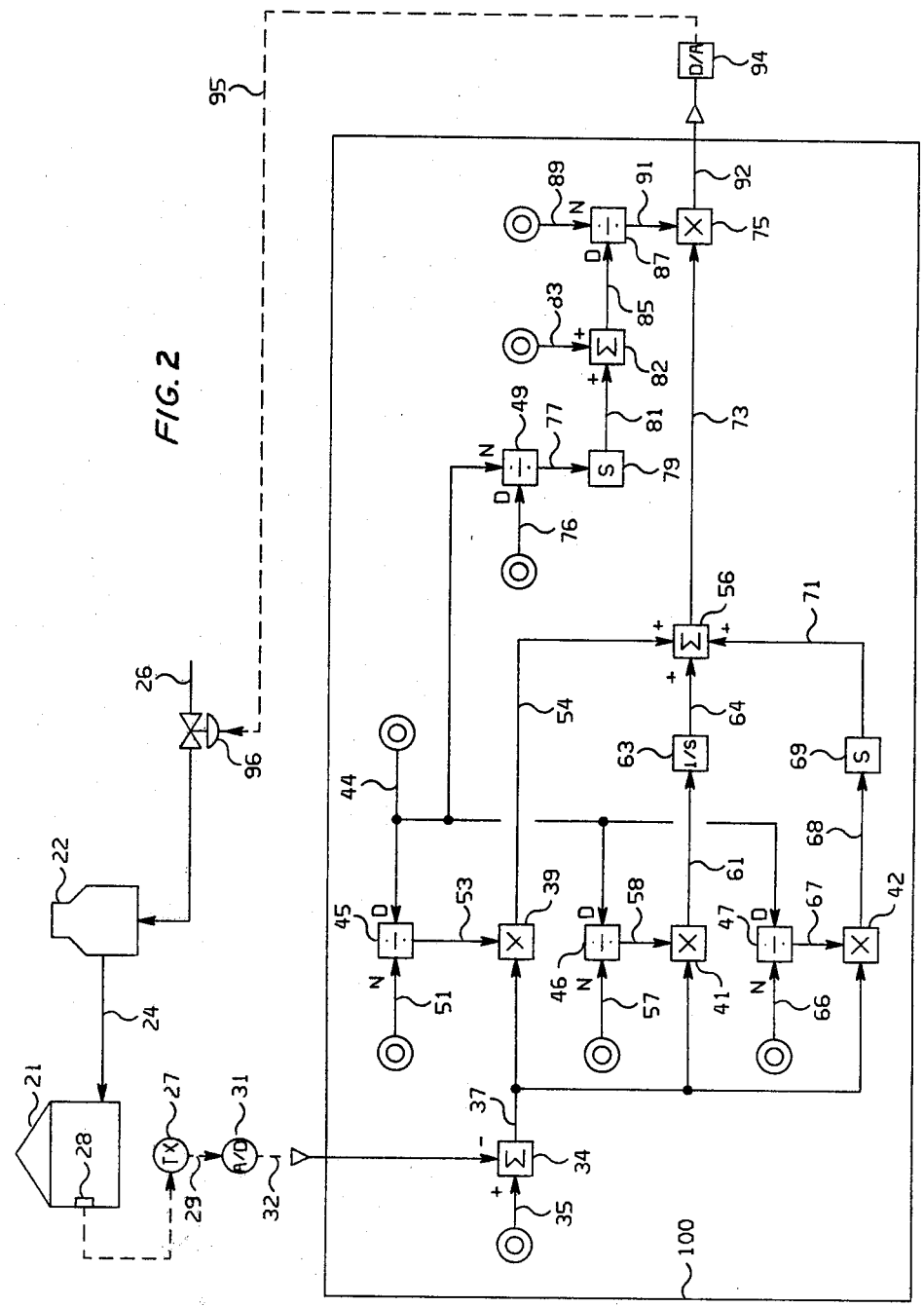
FIG. 2 is a logic flow diagram of a computer implementation of the process controller of the present invention.

A process controller which provides the output of Equation VII in response to an error signal (E) may be implemented on a digital computer or may be implemented utilizing analog logic. Preferably, the process controller of the present invention is implemented on a digital computer and such an implementation is illustrated in FIG. 2. Again, a building heating system is utilized to illustrate the present invention but obviously the present invention is applicable to a wide variety of processes. The Laplace transform notation for integration (1/S) and the Laplace transform notation for taking a derivative (S) is utilized in the logic flow illustrated in FIG. 2 to maintain correspondance between Equation VII and the logic flow of FIG. 2.

Referring now to FIG. 2, there is illustrated a home 21 which is supplied heat from a furnace 22 through conduit means 24. Fuel is supplied to the furnace 22 through conduit means 26. The temperature transducer 27 in conjunction with a temperature measuring device 28 which is operably located in the building 21 provides an output signal 29 which is representative of the temperature in the building 21. Signal 29 is provided from the temperature transducer 27 to the analog-to-digital (A/D) converter 31. Signal 29 is converted from analog form to digital form and is provided as signal 32 to computer means 100 which may be an Optrol 7000 Process Computer System from Applied Automation, Inc., Bartlesville, Okla. Specifically, signal 32 which is representative of the magnitude of the control variable (CV) is provided to the subtrahend input of the summing block 34.

The summing block 34 is also provided with a set point signal 35 which is representative of the desired temperature in the building 21. Signal 32 is subtracted from signal 35 to establish signal 37 which is representative of the difference (E) between the actual temperature in the building 28 and the desired temperature in the building 28. Signal 37 is provided as an input to the multiplying block 39, the multiplying block 41 and the multiplying block 42.

Signal 44 which is representative of $\lambda$ is provided to the denominator input of the dividing block 45, the dividing block 46, and the dividing block 47. Signal 44 is also provided to the numerator input of the dividing block 49. Signal 51 which is representative of the constant $(\tau_1+\tau_2)/2K_1$ is provided to the numerator input of the dividing block 45. Signal 51 is divided by signal 44 to establish signal 53 which is representative of $(\tau_1+\tau_2)/2K_1\lambda$. Signal 53 is provided from the dividing block 45 as an input to the multiplying block 39. Signal 37 is multiplied by signal 53 to establish signal 54 which is representative of $((\tau_1+\tau_2)/2K_1\lambda)(E)$. Signal 54 is provided from the multiplying block 39 as an input to the summing block 56.

Signal 57 which is representative of the constant $\frac{1}{2}K_1$ is provided to the numerator input of the dividing block 46. Signal 57 is divided by signal 44 to establish signal 58 which is representative of $\frac{1}{2}K_1\lambda$. Signal 58 is provided from the dividing block 46 as an input to the multiplying block 41. Signal 37 is multiplied by signal 58 to establish signal 61 which is representative of $E/2K_1\lambda$. Signal 61 is provided from the multiplying block 41 as an input to the integrating block 63. In Laplace notation, signal 61 is multiplied by 1/S to effectively integrate signal 61 with respect to time to thereby establish signal 64 which is representative of $(E/2K_1\lambda)(1/S)$. Signal 64 is provided from the integrating block 63 as a second input to the summing block 56.

Signal 66 which is representative of the constant $\tau_1\tau_2/2K_1$ is supplied to the numerator input of the dividing block 47. Signal 66 is divided by signal 44 to establish signal 67 which is representative of $\tau_1\tau_2/2K_1\lambda$. Signal 67 is provided from the dividing block 47 as an input to the multiplying block 42. Signal 37 is multiplied by signal 67 to establish signal 68 which is representative of $\tau_1\tau_2 E/2K_1\lambda$. Signal 68 is provided from the multiplying block 42 to the derivative block 69. In Laplace notation, signal 68 is multiplied by S to effectively take the derivative of signal 68 with respect to time to thereby establish signal 71 which is representative of $(\tau_1\tau_2 E/2K_1\lambda)(S)$. Signal 71 is provided from the derivative block 69 as a third input to the summing block 56. Signals 54, 64 and 71 are summed in the summing block 56 to establish signal 73 which is representative of $$\left[\left(\frac{\tau_1+\tau_2}{2K_1\lambda}\right)(E) + \left(\frac{E}{2K_1\lambda}\right)\left(\frac{1}{S}\right) + \left(\frac{\tau_1\tau_2 E}{2K_1\lambda}\right)(S)\right]$$

Signal 73 is provided from the summing block 56 as an input to the multiplying block 75.

Signal 76 which is representative of the constant 2 is supplied to the denominator input of the dividing block 49. Signal 44 is divided by signal 76 to establish signal 77 which is representative of $\lambda/2$. Signal 77 is provided from the dividing block 49 as an input to the derivative block 79. As has been previously noted, in Laplace transform notation signal 77 is multiplied by S to effectively take the derivative of signal 77 with respect to time to thereby establish signal 81 which is representative of $(\lambda/2)(S)$. Signal 81 is provided from the derivative block 79 as an input to the summing block 82. The summing block 82 is also provided with signal 83 which is representative of the constant plus one. Signals 81 and 83 are summed to establish signal 85 which is representative of $(\lambda/2)(S)+1$. Signal 85 is provided from the summing block 82 to the denominator input of the dividing block 87. Signal 89 which is representative of the constant plus one is supplied to the numerator input of the dividing block 89. Signal 89 is divided by signal 85 to establish signal 91 which is representative of $$\left[\frac{1}{\lambda/2 S + 1}\right]$$

Signal 91 is provided from the dividing block 87 as an input to the multiplying block 75. Signal 73 is multiplied by signal 91 to thereby establish signal 92 which is representative of the manipulated variable control signal (MV). Signal 92 is provided from computer means 100 as an input to the digital-to-analog (D/A) converter 94. Signal 92 is converted from digital form to analog form and is provided as signal 95 to the pneumatic control valve 96 which is operably located in conduit means 26. The pneumatic control valve 96 is manipulated in response to signal 95 to thereby maintain a flow rate of fuel to the furnace 22 which will maintain the actual temperature in the building 21 substantially equal to the desired temperature in the building 21.

As has been previously stated, the process time constants $\tau_1, \tau_2$ and the process gain $K_1$ are determined by the process characteristics. These constants may be determined from process tests utilizing graphical methods or computer calculations. The techniques by which the process constants are determined are well known and the process of determining the process constants is generally referred to as "identification".

In general, the process time constants $\tau_1$ and $\tau_2$ are determined by making a step-change in the set point and noting the change in the controlled variable (referred to as a "step test"). A step test is made on the process and a plurality (preferably about 10) of data points are recorded. A step test on the process model is made and the same data points are recorded. The difference between each of the process data points and the corresponding process model data points is determined and the differences are summed to give the integral error squared. The time constants $\tau_1$ and $\tau_2$ are determined by adjusting $\tau_1$ and $\tau_2$ in the process model until the minimum integral error squared is achieved.

The process gain K is defined as a change in the controlled variable divided by the change in the manipulated variable which resulted in the change in the controlled variable. Generally, the process gain K is determined by changing the manipulated variable and noting the resulting change in the controlled variable. The change in the controlled variable is divided by the change in the manipulated variable to give the process gain K.

After the constants $\tau_1$, $\tau_2$ and $K_1$ have been determined, the process controller is tuned by determining a plurality of values for $\lambda$ by changing the constant C in Equation VI. The plurality of values for $\lambda$ are tested and the value of $\lambda$ which provides the best process response to a change in the set point is selected. Only a single adjustment is required to tune the process controller illustrated in FIG. 2 and this greatly simplifies the tuning of the process controller.

While the invention has been described in terms of the presently preferred embodiment, reasonable variations and modifications are possible by those skilled in the art within the scope of the described invention and the appended claims. In particular, analog circuits could be utilized to implement the process controller if desired.

That which is claimed is:

1. A method for maintaining the value of a controlled process variable substantially equal to a desired value for said controlled process variable, wherein said controlled process variable is responsive to changes in a manipulated process variable, and wherein said process can be represented by a general second order equation of the form $$G_P(S) = \frac{K_1}{(\tau_1 S + 1)(\tau_2 S + 1)}$$

where
  $G_P$ = process transfer function;
  $K_1$ = process gain;
  $\tau_1$ and $\tau_2$ = process time constants; and
  S = Laplace operator;
said method comprising the steps of:
  establishing a first signal which is representative of the actual value of said controlled process variable;
  establishing a second signal representative of the desired value of said controlled process variable;
  establishing a third signal representative of the difference (E) between said first signal and said second signal in response to said first signal and said second signal;
  supplying said third signal to a process controller having a transfer function given by $$G_C(S) = \left[\frac{\tau_1+\tau_2}{2K_1\lambda} + \frac{1}{2K_1\lambda S} + \frac{\tau_1\tau_2 S}{2K_1\lambda}\right]\left[\frac{1}{(\lambda/2)(S)+1}\right]$$

where
- $G_C$ = process controller transfer function;
- $\lambda = C(\tau_1 + \tau_2)/2$;
- C has a value in the range of about 0.75 to about 1.25; and
- $\tau_1$, $\tau_2$, $K_1$ and S are as previously defined;

said process controller providing a manipulated variable control signal equal to $$\left[\left(\frac{\tau_1 + \tau_2}{2K_1\lambda}\right)(E) + \left(\frac{E}{2K_1\lambda}\right)\left(\frac{1}{S}\right) + \left(\frac{\tau_1\tau_2 E}{2K_1\lambda}\right)(S)\right]\left[\frac{1}{(\lambda/2(S) + 1}\right]$$

and
manipulating said manipulated variable in response to said manipulated variable control signal to thereby maintain said controlled process variable substantially equal to the desired value for said control process variable, wherein said method additionally comprises the steps of:

(a) calculating a plurality of values for $\lambda$;
(b) substituting a calculated value for $\lambda$ into the transfer function of said process controller;
(c) noting the response of said controlled process variable to a change in the desired value of said controlled process variable;
(d) repeating steps (b) and (c) until all of the calculated values of $\lambda$ have been tested; and
(e) selecting the value of $\lambda$ for which the response of said controlled process variable to a change in the desired value of said controlled process variable most closely approximates a critically damped response to thereby tune said process controller.

* * * * *